(12) United States Patent
Pan et al.

(10) Patent No.: US 7,385,894 B2
(45) Date of Patent: Jun. 10, 2008

(54) METHOD FOR DETERMINING DEFECTIVE BLOCKS OF OPTICAL DISC

(75) Inventors: Yi-Chuan Pan, Hsinchu (TW); Jen-Kuei Hsieh, Hsinchu (TW)

(73) Assignee: Lite-On it Corp., Taipei (TW)

( * ) Notice: Subject to any disclaimer, the term of this patent is extended or adjusted under 35 U.S.C. 154(b) by 582 days.

(21) Appl. No.: 11/132,881

(22) Filed: May 19, 2005

(65) Prior Publication Data
US 2005/0265170 A1   Dec. 1, 2005

(30) Foreign Application Priority Data
May 26, 2004 (TW) .............................. 93114935 A

(51) Int. Cl.
*G11B 7/00* (2006.01)
(52) U.S. Cl. ................. 369/53.15; 369/53.17
(58) Field of Classification Search ............. 369/53.12, 369/53.13, 53.15, 53.17
See application file for complete search history.

(56) References Cited

U.S. PATENT DOCUMENTS 5,956,309 A * 9/1999 Yamamuro ................ 369/47.14

* cited by examiner

*Primary Examiner*—Nabil Hindi
(74) *Attorney, Agent, or Firm*—Kirton & McConkie; Evan R. Witt

(57) ABSTRACT

In a method for determining defective blocks of an optical disc, a defect-detection procedure for each block of the optical disc is performed. After the defect-detection procedure, a preliminary defective group of the optical disc is realized. Subsequently, the track number between two selected defective blocks of the preliminary defective group are detected. When the track number is less than a predetermined number, the blocks lying in a linear region including the two selected blocks are defined as defective blocks in addition to all defective blocks included in the preliminary defective group.

20 Claims, 9 Drawing Sheets

METHOD FOR DETERMINING DEFECTIVE BLOCKS OF OPTICAL DISC

FIELD OF THE INVENTION

The present invention relates to a method for determining defective blocks of an optical disc, and more particularly to a method for determining defective blocks of an optical disc in an optical recording/reproducing apparatus.

BACKGROUND OF THE INVENTION

A data-rewritable optical disc such as CD-RW (Compact Disc-Rewritable) is widely used to record data so the data can be amended when necessary. Recently, CD-MRW (CD-Mount Rainier Written) has been introduced to the market. Such type of data-rewritable optical disc is especially advantageous for providing background formatting and defect management to examine and prepare the recordable area of a disc. According to CD-MRW technique, defective blocks will be marked and managed so that these defective blocks will be hidden and not available for further accessing.

An approach to detect defective blocks will be described herein with reference to FIGS. 1 and 2. The data processing system of FIG. 1 comprises an optical pickup head 20, a pre-amplifier 21, a sub-beam addition signal (SBAD) low pass filter 22, a digital signal processor (DSP) 23 and a micro-controller 24. The optical pickup head 20 has several light receiving parts (not shown) for respectively receiving the light reflected from one of the blocks of a disc 10, e.g. block 11, and producing sub-beam signals SB (Step S11, FIG. 2). These sub-beam signals SB are amplified through the pre-amplifier 21 to generate a sub-beam addition signal SBAD (Step S12). The sub-beam addition signal SBAD is substantially the summation partial or all of these sub-beam signals. The sub-beam addition signal SBAD is then filtered by the SBAD low pass filter 22 to generate a low pass signal $SBAD_{low\ pass}$ (Step S13). If an absolute value of $|SBAD-SBAD_{low\ pass}|$ is greater than a threshold value, the block is determined to be a defective block (Step S14), or otherwise, a non-defective block (Step S15). The information relating to the defective block is then recorded in the micro-controller 24 so as to prevent from writing data into the defective block subsequently (Step S16). The above detecting steps are repeated until all blocks on the disc 10 are tested.

The above method for detecting defective blocks, however, may have some limitation due to improper threshold setting or noise interference. For example, as shown in FIG. 3, a scratch S and some defective blocks, e.g. C and D, exist in the optical disc 30. Under certain high threshold or noise condition, it is possible that only blocks A and B in the scratch S are detected as defective blocks according to the above defect-detection method. Since the blocks included in the scratch S, except the blocks A and B, are determined as non-defective ones, data will be subsequently written therein. Thus, accessing errors may still occur on the undetected but damaged blocks in the vicinity of the scratch S other than block A and B.

SUMMARY OF THE INVENTION

The present invention provides a method for determining defective blocks of an optical disc including the latent defective ones so as to prevent from writing data into the defective blocks.

According to the present method, a defect-detection procedure for each block of the optical disc is performed by for example a CD-MRW disc driver. In an embodiment, the defect-detection procedure comprises steps of generating a sub-beam addition signal in response to the light reflected from a currently detected block of the optical disc, performing a low pass filtering operation on the sub-beam addition signal to obtain a low pass sub-beam addition signal and including the currently detected block in the preliminary defective group as a defective block when an absolute value of an intensity difference between the sub-beam addition signal and the low pass sub-beam addition signal is greater than a threshold value. After the defect-detection procedure, a preliminary defective group of the optical disc is realized.

According to the present method, the track number between two selected defective blocks of the preliminary defective group is detected. When the track number is less than a predetermined number, the blocks lying in a linear region including the two selected blocks are defined as defective blocks in addition to all defective blocks included in the preliminary defective group. Preferably, by designating every two defective blocks of the preliminary defective group as the two selected defective blocks, the track-number detecting step and the defective-block defining step are repetitively performed. In an embodiment, the linear region includes the two selected defective blocks and all blocks linearly located therebetween. Alternatively, the linear region further includes a certain number of blocks oppositely extending from the two selected defective blocks.

The present invention also provides a method for locating latent defective blocks of an optical disc. According to the present method, a defect-detection procedure for each block of the optical disc is performed to realize a preliminary defective group of the optical disc. And a discriminating procedure is further performed for defining blocks lying linearly between any two primary defective blocks as latent defective blocks. In an embodiment, if the track number between selected two of the primary defective blocks is less than a predetermined number, the blocks lying in a linear region between said two selected blocks will be marked as defective blocks.

The present invention further provides a method for recording data into an optical disc. According to the present method, a defect-detection procedure for each block of the optical disc is performed to realize a first defective group of blocks of the optical disc. If the track number between any two of the first defective group is less than a predetermined number, the blocks lying within a linearly continuous region will be determined as a second defective group of blocks. Data are written into the optical disc with prohibiting from writing data into the first and second defective groups.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
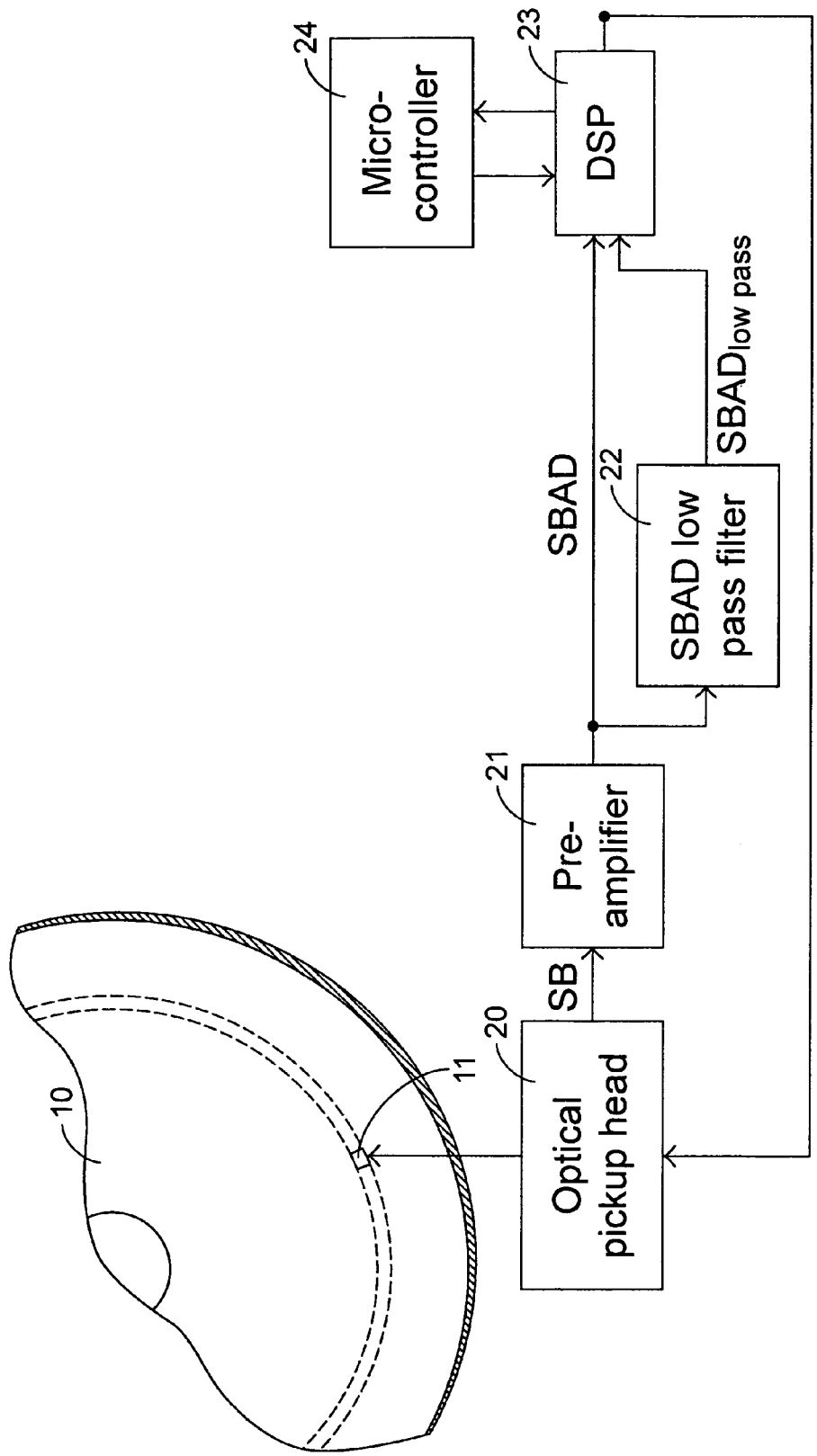
FIG. 1 is a functional block diagram illustrating a data processing system of an optical disc drive.
Figure 2:
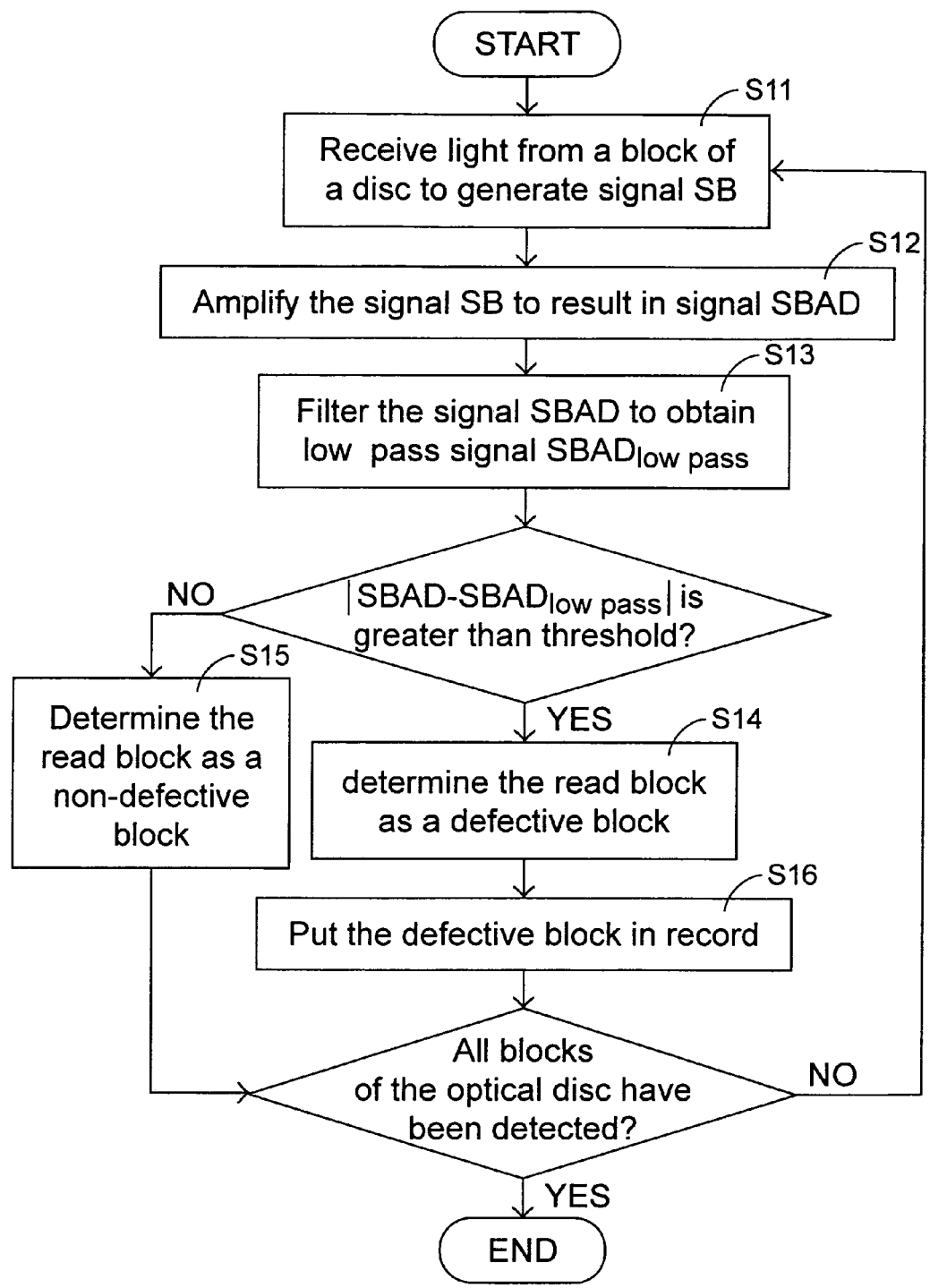
FIG. 2 is a flowchart illustrating a method for determining defective blocks according to prior art.
Figure 3:
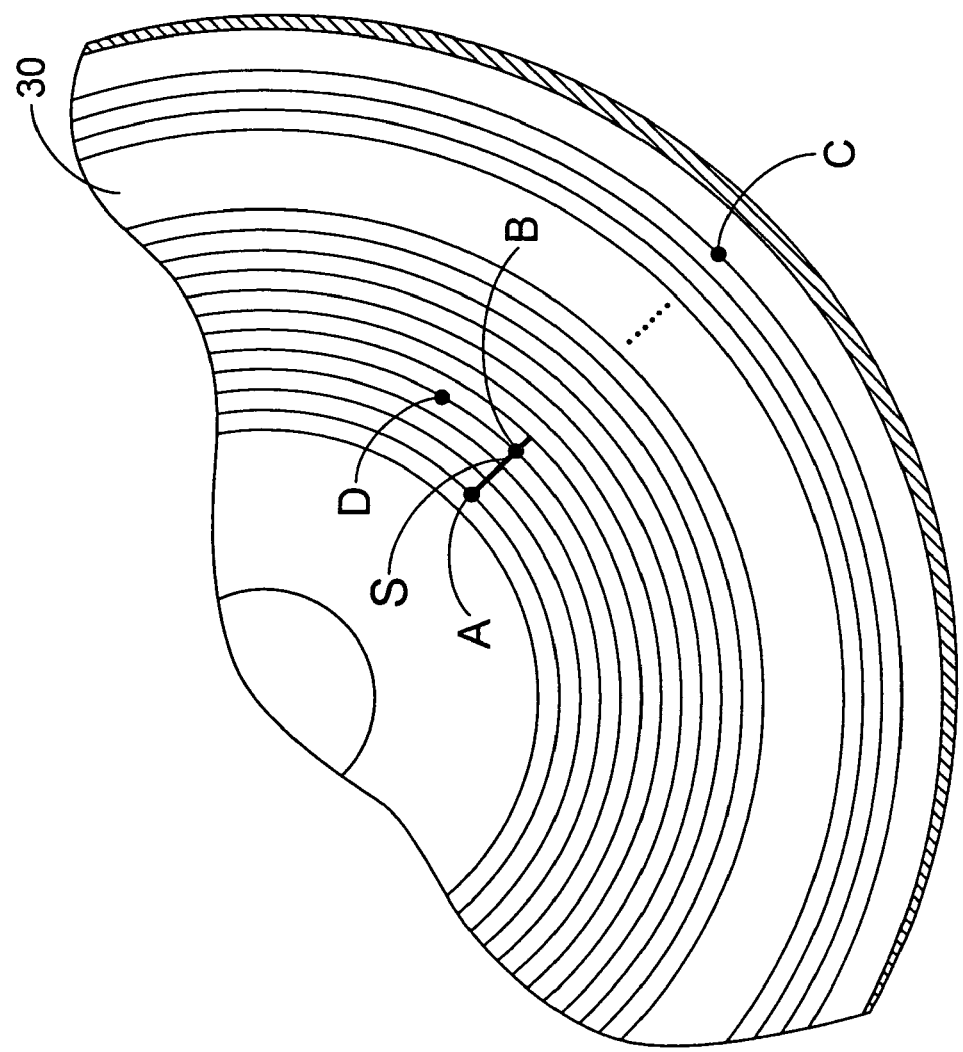
FIG. 3 is a schematic view of an optical disc having a scratch and some defective blocks thereon.
Figure 4A:
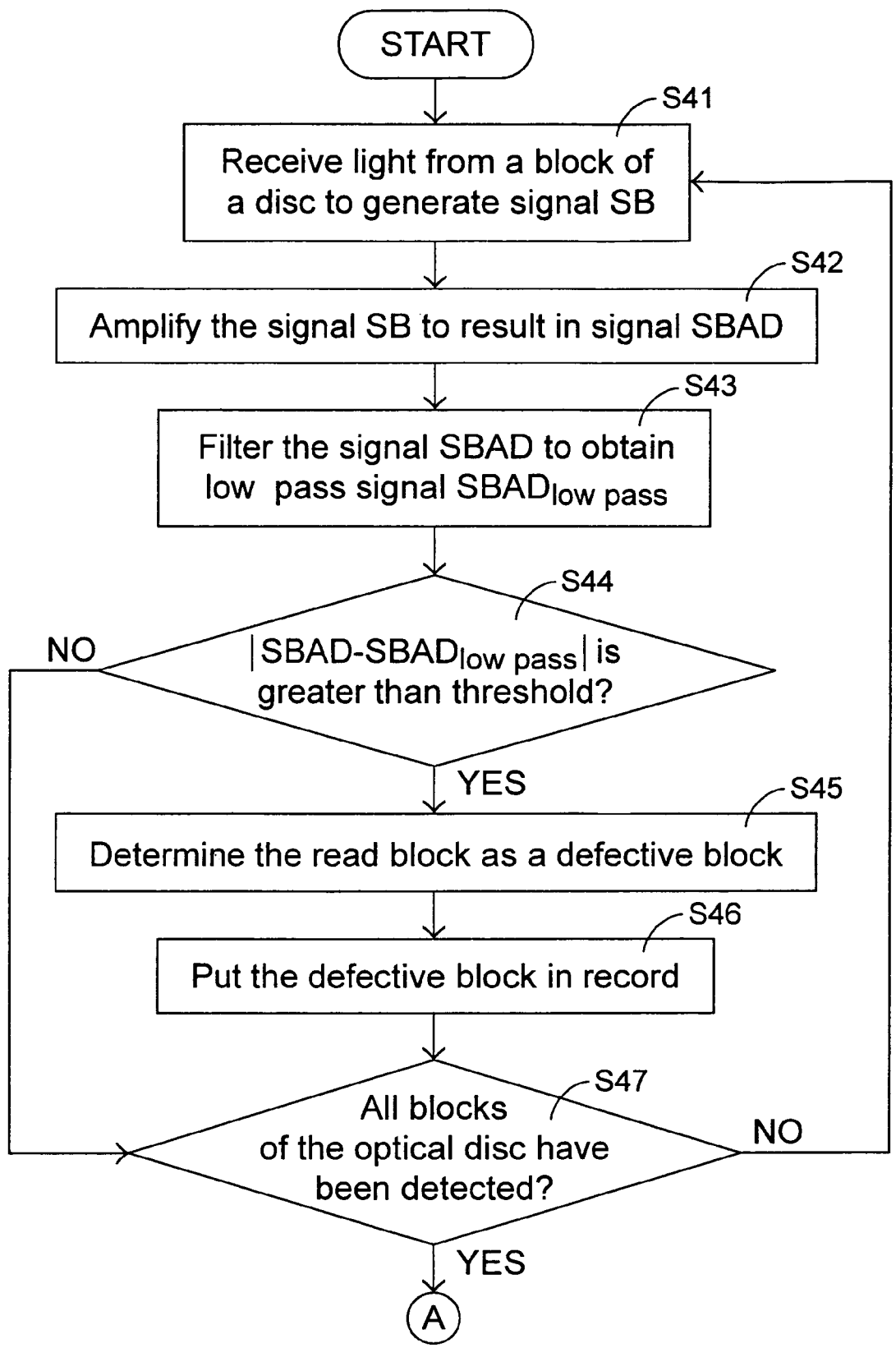
FIGS. 4A and 4B are a flowchart illustrating a method for determining defective blocks according to an embodiment of the present invention.
Figure 4B:
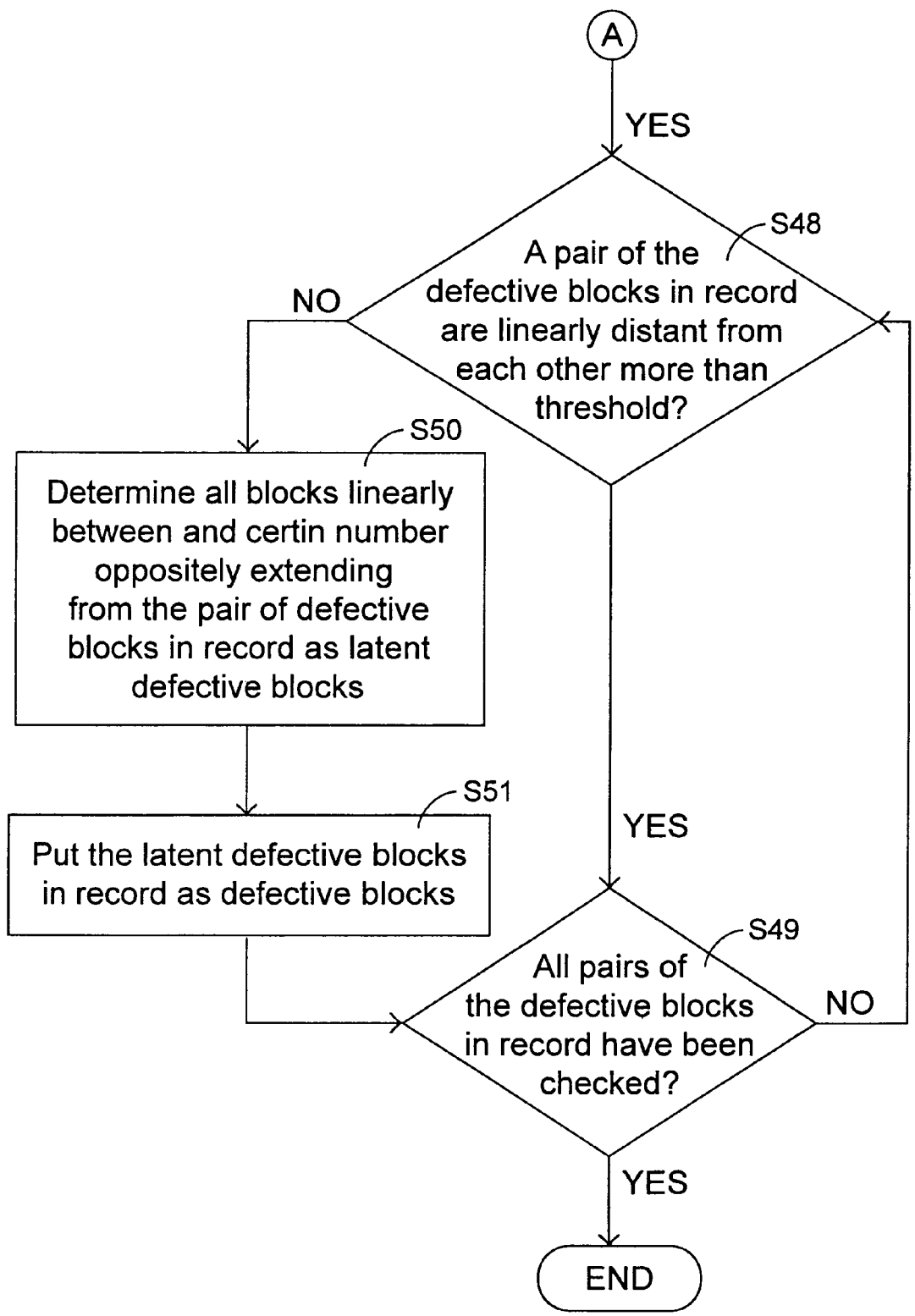

Hereinafter, an embodiment of a method for determining defective blocks according to the present invention will be illustrated with reference to the data processing system of FIG. 1 and the flowchart of FIGS. 4A and 4B. In this embodiment, the method includes a defect-detection procedure to determine defective blocks and a discriminating procedure to further locate latent defective blocks.

In the defect-detection procedure, the plural light receiving parts of the optical pickup head 20 respectively receive the light reflected from one of the blocks of the disc 10, e.g. block 11, and producing sub-beam signals SB accordingly (Step S41, FIG. 4). These sub-beam signals SB are amplified through the pre-amplifier 21 to generate a sub-beam addition signal SBAD (Step S42). The sub-beam addition signal SBAD is substantially the summation of partial or all these sub-beam signals. The sub-beam addition signal SBAD is then filtered by the SBAD low pass filter 22 to generate a low pass signal $SBAD_{low\ pass}$ (Step 43). Then an absolute value of $|SBAD-SBAD_{low\ pass}|$ is checked (Step 44). If the absolute value is greater than a threshold value, the block will be determined as a defective block (Step S45). The information relating to the defective block is then recorded for example in the micro-controller 24 (Step S46). The above detecting steps are repeated until all blocks on the disc 10 are tested (Step S47). After the defect-detection procedure is performed, a preliminary defective group is realized, and subsequently, latent defective blocks that might be undesirably neglected in the above defect-detection procedure due to improper threshold setting or noise interference are further located according to the preliminary defective group.

From the preliminary defective group, any two defective blocks are selected to check if they are linearly distant from each other more than a threshold (Step S48), for example by detecting the track number therebetween and comparing it with a threshold number which could be set as a single-digit positive integer. If the two defective blocks are separated far enough, they will not be considered relevant. Therefore, it jumps to another pair of defective blocks in the preliminary defective group to do the Step S48 check. On the other hand, if the selected two defective blocks are close to each other to a certain extent, i.e. the track number between the two detective blocks is no greater than a predetermined number, it is reasonably inferred that there is highly possibly a scratch passing the two defective blocks in the optical disc. Therefore, all the blocks lying linearly between the two defective blocks and a certain number of blocks oppositely extending from the two selected defective blocks should also be considered as defective blocks (Step S50), and are put in the record (Step S51). When all the pairs in the preliminary defective blocks are checked (Step S49), defective blocks including primary defective blocks and latent defective blocks are determined. Accordingly, data written into the optical disc can be prohibited from recording in the defective blocks.

Figure 5A:
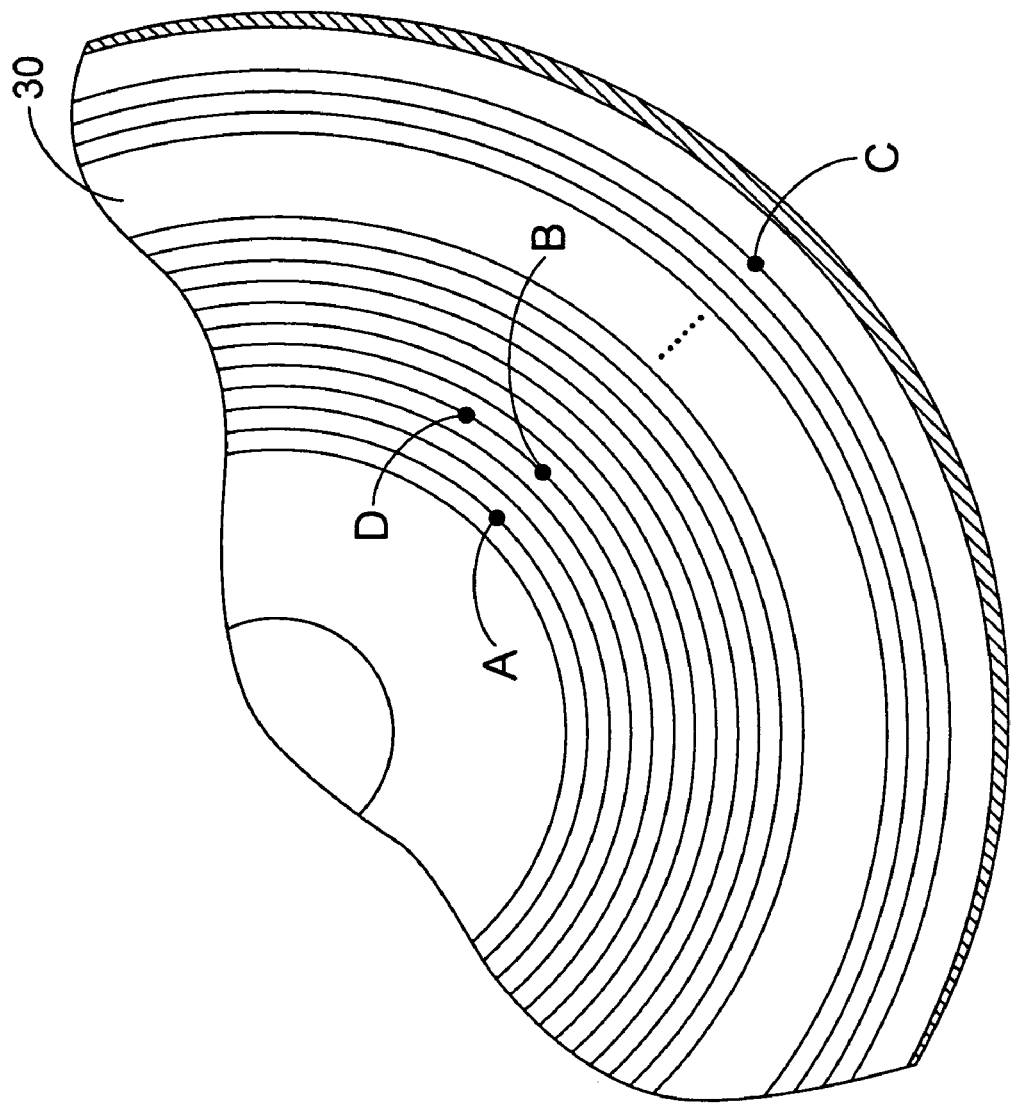
FIGS. 5A~5D are schematic views of an optical disc illustrating steps of defining latent defective blocks.
Figure 5B:
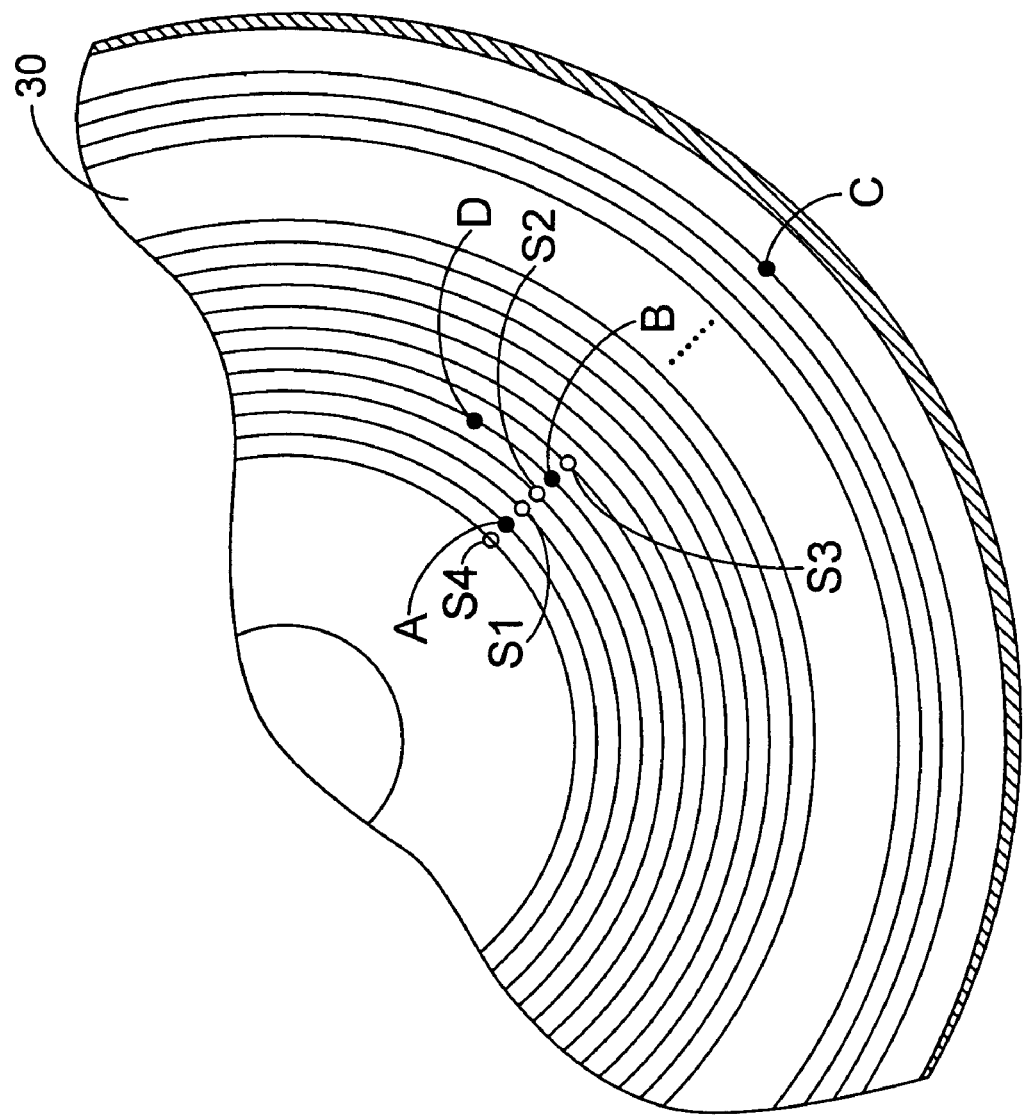

Hereinafter, an example is given with reference to FIGS. 5 and 6 to describe how the latent defective blocks of the optical disc 30 are determined. After the defect-detection procedure is performed, primary defective blocks A, B, C and D are detected, as shown in FIG. 5A. Then, the track numbers between the defective block-pairs (A,B), (A,C), (A,D), (B,C), (B,D) and (C,D) are detected. In this example, the threshold track number for determining whether two defective blocks are linearly distant from each other or not is set to be 5. Accordingly, the pairs (A,C), (B,C) and (C,D) are not further processed. On the other hand, since the track number between the defective blocks A and B is less than the predetermined threshold number, as shown in FIG. 5B, the blocks S1 and S2 lying linearly between the two primary defective blocks A and B are defined as latent defective blocks and put in record. In addition, the blocks S3 and S4 oppositely extending from the defective blocks A and B by one block are also defined as latent defective blocks and put in record.

Figure 5C:
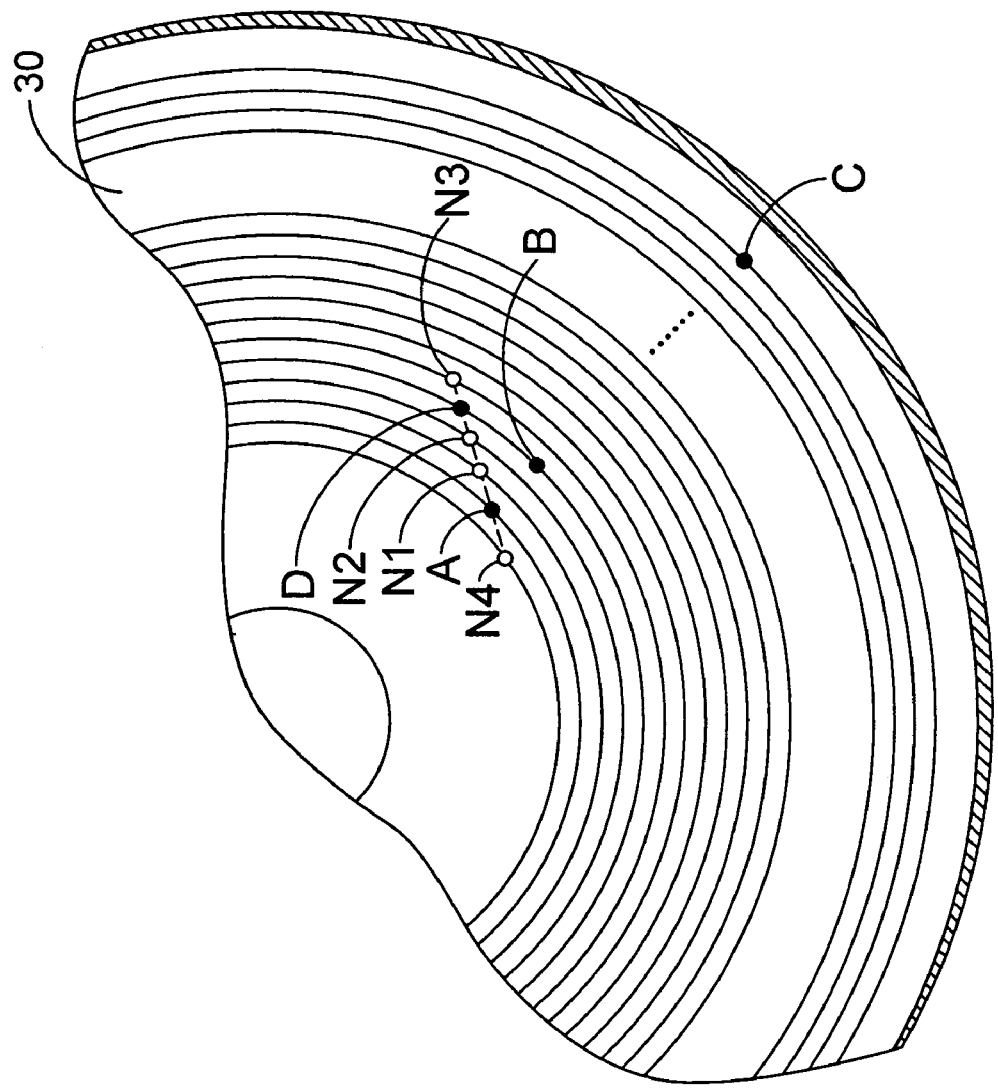
Figure 5D:
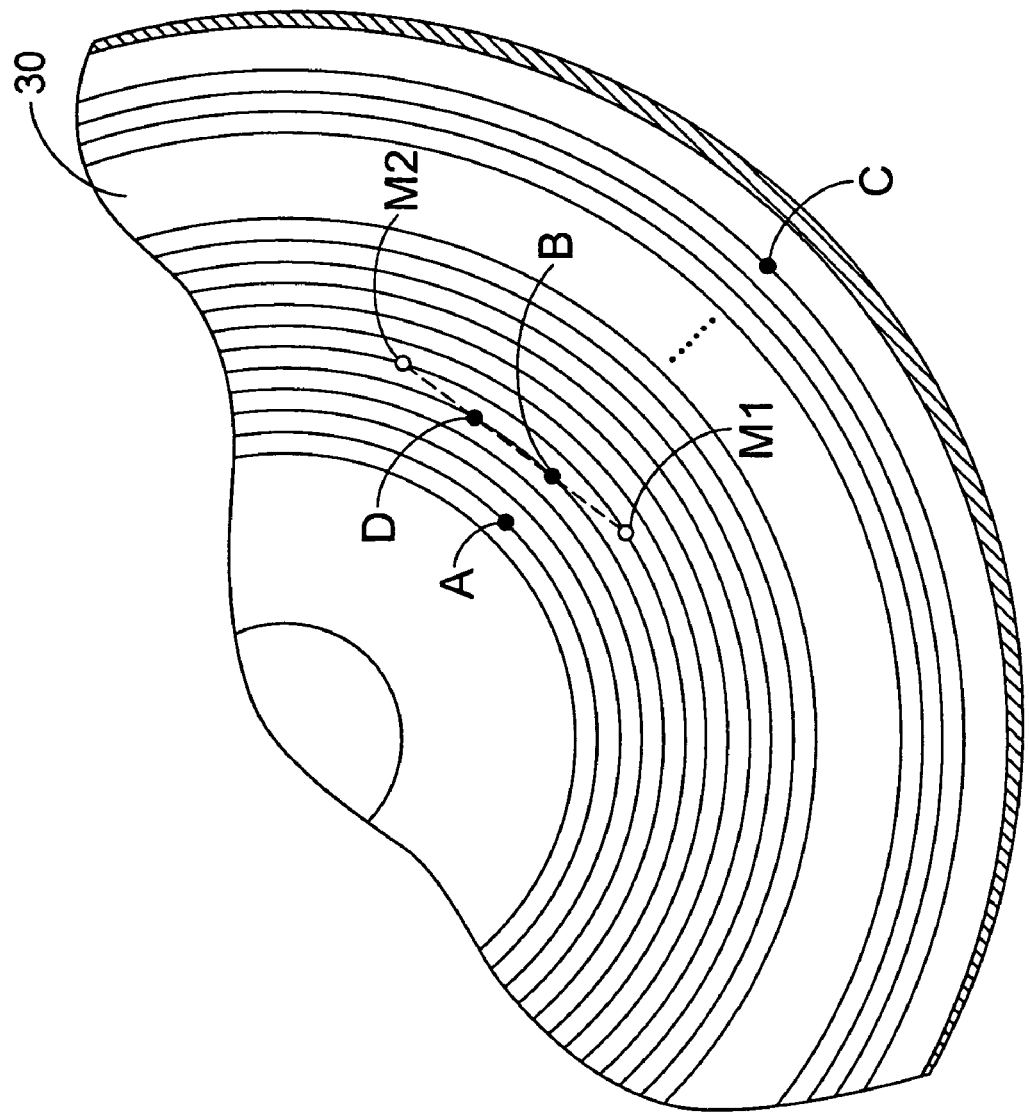

The above discriminating steps are repeated for another pair of defective blocks A and D, as shown in FIG. 5C. Since the track number between the defective blocks A and D is less than the predetermined number, the blocks N1 and N2 lying linearly between the defective blocks A and D and the blocks N3 and N4 oppositely extending from the defective blocks A and D by one block are defined as the latent defective blocks. Likewise, as shown in FIG. 5D, the blocks M1 and M2 oppositely extending from the defective blocks B and D are also defined as latent defective blocks. All the latent defective blocks S1~S4, N1~N4 and M1~M2 are also marked as defective blocks as well as all primary defective blocks A, B, C and D detected in the defect-detection procedure. Therefore, data will not be written into all those defective blocks A, B, C, D, S1~S4, N1~N4 and M1~M2 in the optical disc 30, thereby minimizing errors as possible as it can.

From the above description, it is understood the method for determining defective blocks of an optical disc according to the present invention is capable of minimizing the accessing errors by locating as many defective blocks including latent defective blocks as possible and prohibiting from writing data into those defective blocks.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for determining defective blocks of an optical disc, comprising steps of:
   performing a defect-detection procedure to realize a preliminary defective group of said optical disc;
   detecting a track number between two selected defective blocks of said preliminary defective group; and
   defining blocks lying in a linear region between said two selected blocks as defective blocks in addition to all defective blocks included in said preliminary defective group when said track number is less than a predetermined number.

2. The method according to claim 1 wherein said defect-detection procedure comprises steps of:
   generating a sub-beam addition signal in response to the light reflected from a currently detected block of said optical disc;
   performing a low pass filtering operation on said sub-beam addition signal to obtain a low pass sub-beam addition signal; and
   including said currently detected block in said preliminary defective group as a defective block when an absolute value of an intensity difference between said sub-beam addition signal and said low pass sub-beam addition signal is greater than a threshold value.

3. The method according to claim 2 wherein said defect-detection procedure is done for each block of said optical disc.

4. The method according to claim 1 wherein said linear region includes all blocks linearly located between said two selected defective blocks.

5. The method according to claim 4 further defining a certain number of blocks oppositely extending from said two selected defective blocks as defective blocks.

6. The method according to claim 1 wherein said track-number detecting step and said defective-block defining step are repetitively performed by designating every two defective blocks of said preliminary defective group as said two selected defective blocks.

7. The method according to claim 1 wherein said defect-detection procedure is performed by a CD-MRW disc driver.

8. The method according to claim 1 wherein said predetermined number is a single-digit positive integer.

9. A method for locating latent defective blocks of an optical disc, comprising steps of:
 performing a defect-detection procedure to realize primary defective blocks; and
 performing a discriminating procedure for defining blocks lying linearly between any two primary defective blocks as latent defective blocks.

10. The method according to claim 9 wherein said discriminating procedure comprises:
 detecting a track number between two selected defective blocks of said preliminary defective blocks; and
 defining blocks lying in a linear region between said two selected blocks as defective blocks when said track number is less than a predetermined number.

11. The method according to claim 9 wherein said defect-detection procedure comprises steps of:
 generating a sub-beam addition signal in response to the light reflected from a currently detected block of said optical disc;
 performing a low pass filtering operation on said sub-beam addition signal to obtain a low pass sub-beam addition signal; and
 determining said currently detected block as a primary defective block when an absolute value of an intensity difference between said sub-beam addition signal and said low pass sub-beam addition signal is greater than a threshold value.

12. The method according to claim 11 wherein said defect-detection procedure is done for each block of said optical disc.

13. The method according to claim 11 further comprising a step of defining a certain number of blocks linearly and oppositely extending from any two primary defective blocks that comply with said certain rule as latent defective blocks.

14. The method according to claim 9 wherein said defect-detection procedure is performed by a CD-MRW disc driver.

15. The method according to claim 9 wherein said predetermined number is a single-digit positive integer.

16. A method for recording data into an optical disc, comprising steps of:
 performing a defect-detection procedure to realize a first defective group of blocks;
 determining whether a track number between any two blocks of said first defective group is less than a predetermined number;
 defining blocks lying within a linearly continuous region including said two defective blocks as a second defective group of blocks; and
 writing data into said optical disc with prohibiting from writing data into said first and second defective groups.

17. The method according to claim 16 wherein said defect-detection procedure comprises steps of:
 generating a sub-beam addition signal in response to the light reflected from a currently detected block of said optical disc;
 performing a low pass filtering operation on said sub-beam addition signal to obtain a low pass sub-beam addition signal; and
 including said currently detected block in said first defective group as a defective block when an absolute value of an intensity difference between said sub-beam addition signal and said low pass sub-beam addition signal is greater than a threshold value.

18. The method according to claim 16 wherein said defect-detection procedure is done for each block of said optical disc.

19. The method according to claim 16 wherein said defect-detection procedure is performed by a CD-MRW disc driver.

20. The method according to claim 16 wherein said predetermined number is a single-digit positive integer.

* * * * *